United States Patent [19]

Kuo

[11] Patent Number: 5,349,010
[45] Date of Patent: Sep. 20, 1994

[54] WATER-DISPERSIBLE POLYESTER RESINS AND PROCESS FOR THEIR PREPARATION

[75] Inventor: Thauming Kuo, Kingsport, Tenn.

[73] Assignee: Eastman Chemical Company, Kingsport, Tenn.

[21] Appl. No.: 954,857

[22] Filed: Sep. 30, 1992

[51] Int. Cl.$^5$ .............................................. C08L 67/00
[52] U.S. Cl. ................................... 524/600; 528/295
[58] Field of Search .......................... 524/600; 528/295

[56] References Cited

U.S. PATENT DOCUMENTS

| | | | |
|---|---|---|---|
| 3,345,313 | 10/1967 | Ruhf et al. | 260/22 |
| 3,434,987 | 3/1969 | Dhein et al. | 260/21 |
| 3,494,882 | 2/1970 | Andrews | 260/22 |
| 3,549,577 | 12/1970 | Stromberg | 260/29.4 |
| 3,563,942 | 2/1971 | Heiberger | 260/29.2 |
| 3,666,698 | 5/1972 | Harris et al. | 260/22 |
| 3,699,066 | 10/1972 | Hunsucker | 260/22 |
| 4,340,519 | 7/1982 | Kotera et al. | 523/414 |
| 4,483,963 | 11/1984 | Meyer | 525/44 |
| 4,483,969 | 11/1984 | Joyner et al. | 525/437 |
| 4,525,524 | 6/1985 | Tung et al. | 524/601 |
| 4,622,381 | 11/1986 | Suzuki et al. | 528/295 |
| 4,698,391 | 10/1987 | Yacobucci et al. | 525/162 |
| 4,737,551 | 4/1988 | Dervan et al. | 525/440 |
| 4,818,569 | 4/1989 | Trinh et al. | 427/242 |
| 4,910,292 | 3/1990 | Blount | 528/272 |
| 4,973,656 | 11/1990 | Blount | 528/272 |
| 4,990,593 | 2/1991 | Blount | 528/272 |

OTHER PUBLICATIONS

Derwent Abstract WPI Acc No: 68-07118Q/00 (GB 1117126).
Derwent Abstract WPI Acc No: 87-097859/14 (JP 62045731).
Derwent Abstract WPI Acc No: 87-068675/10 (JP 62021816).
Derwent Abstract WPI Acc No: 86-095403/15 (JP 61289116).

*Primary Examiner*—Paul R. Michl
*Assistant Examiner*—Edward Cain
*Attorney, Agent, or Firm*—Mark A. Montgomery

[57] ABSTRACT

Disclosed is a water-dissipatable or dispersible polyester containing sulfonate groups that has improved stability prepared from a monocarboxylic acid sulfomonomer. This polyester can be prepared in a one or two step process but the preferred two step process entails polymerizing the reactants wherein the monocarboxylic acid sulfomonomer has been pre-reacted with a monofunctional reactant containing at least three hydroxyl groups to form a diol adduct.

25 Claims, No Drawings

WATER-DISPERSIBLE POLYESTER RESINS AND PROCESS FOR THEIR PREPARATION

FIELD OF THE INVENTION

The present invention relates to novel water-dispersible polyesters, the method of their preparation, and coatings prepared therefrom.

BACKGROUND OF THE INVENTION

Regulations to limit the amount of volatile organic compounds (VOC) of industrial coatings has encouraged research and development projects directed at inventing new waterborne systems such as paints. With respect to the two most important commercial coating systems, polyesters and acrylics, it is a relatively easy task to characterize the current state-of-the-art: polymeric systems with a carbon backbone (acrylics) are more stable to hydrolysis than polyesters with their carbon-oxygen ester backbone chain. However, considerable research continues toward improving the stability of aqueous polyesters because of their inherently desirable properties of excellent hardness/flexibility ratios and outstanding gloss unattainable from aqueous acrylic systems.

U.S. Pat. No. 4,340,519 discloses the composition of certain crystalline and non-crystalline polyesters copolymerized with a metal sulfonate group-containing aromatic acid and up to 10 mol percent (based on the total polyol content) of a polyvalent polyol selected from trimethylolpropane, trimethylolethane, glycerine, and pentaerythritol. Also, U.S. Pat. No. 4,525,524 discloses liquid systems comprised of polyesters containing certain metal sulfonates and, optionally, up to 3 percent of a branching agent based upon the total diol component.

U.S. Pat. No. 3,563,942 discloses linear solvent-soluble copolyester compositions that can be dispersed in water. Water dispersibility is gained by the addition to the copolyester of a small amount (1–2 mol percent) of the metal salt of sulfonated aromatic compounds.

U.S. Pat. Nos. 4,483,963, 4,622,381 and 4,818,569 and Jp 62045731, 62021816, and 61289116 disclose high molecular weight, linear polymers end-capped with sulfobenzoyl groups.

Many patents disclose methods to obtain water-dissipatable polyesters by neutralizing residual or unreacted carboxylic acid groups on the polymer with ammonia or various organic amines. U.S. Pat. No. 3,666,698 utilizes this method as well as phenylindandicarboxylic acid to modify coating performance. U.S. Pat. No. 3,699,066 shows the benefits of certain hydroxy-functional amines for neutralization. U.S. Pat. No. 3,549,577 utilizes the amino resin crosslinker as the neutralizing agent then adjusts the pH to prepare an alkaline water-reduced system. In these patents as well as in U.S. Pat. No. 3,494,882, U.S. Pat. No. 3,434,987, U.K. 1,117,126, and U.S. Pat. No. 3,345,313 carboxylic acid functionality is completely neutralized with excess base yielding an alkaline paint vehicle.

None of the above items disclose an aqueous dispersion of a polyester containing a sulfomonomer having a pH greater than 4.

U.S. Pat. Nos. 4,910,292, 4,973,656 and 4,990,593 the disclosures of which are incorporated herein in their entirety by reference, disclose an improved water-borne polyester resin and coatings specifically containing 5-(sodiosulfo)-isophthalic acid (5-SSIPA or SIP). The resins are prepared by reacting neopentyl glycol (NPG), trimethylolpropane (TMP), isophthalic acid (IPA), and 5-SSIPA in the first stage, followed by the addition of IPA and adipic acid (AD) in the second stage. The clear coating prepared from this resin exhibits good properties of gloss, hardness, flexibility, and solvent resistance. Moreover, the coating is water-resistant, despite the presence of ionic sulfonate groups. However, as with other polyester resins, aqueous dispersions of these resins do not have adequate storage stability and phase-separate over time. Additionally, the pigmented enamels prepared from these dispersions do not have adequate storage stability and phase-separate in a relatively short period of time.

It would, therefore, be very desirable to be able to improve the overall stability of dispersions of water-dispersible polyester resins and the pigmented enamels prepared therefrom.

One solution to this problem is disclosed in pending U.S. application Ser. No. 07/765,606 filed Sep. 25, 1991. This application discloses end-capping the dicarboxylic acid sulfomonomer.

SUMMARY OF THE INVENTION

The present invention is directed to a water-dispersible composition comprising the polyester made of the moieties of reaction products:

(a) at least one difunctional dicarboxylic acid which is not a sulfomonomer;

(b) about 1 to 20 mol % of at least one monocarboxylic acid sulfomonomer containing at least one metallic sulfonate group or nitrogen-containing non-metallic sulfonate group attached to an aromatic or cycloaliphatic nucleus;

(c) at least one difunctional reactant selected from a glycol or a mixture of a glycol and diamine having two —NRH groups, the glycol containing two —C($R^1$)$_2$—OH groups wherein R in the reactant is hydrogen or an alkyl group of 1 to 6 carbon atoms, and $R^1$ in the reactant is a hydrogen atom, an alkyl of 1 to 5 carbon atoms, or an aryl group of 6 to 10 carbon atoms;

(d) about 0 to 40 mol % of difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and (e) up to 40 mol % of a multifunctional reactant containing at least three functional groups selected from hydroxyl, carboxyl, and mixtures thereof, wherein at least a portion of the multifunctional reactant contains at least three hydroxyl groups, wherein all stated mol percentages are based on the total of all acid, hydroxyl and amino group containing reactants being equal to 200 mol %, and wherein the polymer contains proportions of acid-group containing reactants (100 mol % acid) to hydroxy- and amino--group containing reactants (100 mol % base) such that the value of EQ (base) divided by EQ (acid) is between about 0.5 and 2.

Preferred alkyl groups are methyl, ethyl, n-propyl, isopropyl, n-butyl, sec-butyl and iso-butyl; preferred aryl groups are phenyl and naphthyl.

The present invention is also directed to a process for the preparation of a polyester comprising reacting under polycondensation conditions reactants (a), (b), (c), (d), and (e) above.

The present invention is also directed to a diol composition that is essentially the product of (b) above and at least a portion of (e) above. This composition comprises the ester adduct made of the moieties of reaction produces:

(A) a monocarboxylic acid sulfomonomer containing at least one metallic sulfonate group or nitrogen-containing non-metallic sulfonate group attached to an aromatic or cycloaliphatic nucleus, and (B) a multifunctional reactant containing at least three hydroxyl groups.

The present invention is also directed to a water-dispersible composition comprising the polyester made from the moieties of the reaction products (a), (b), (c), (d), and (e) above except that:

(b) is about 1 to 20 mol % of at least one diol that is a diol adduct of a multifunctional reactant containing at least three hydroxyl groups and a monocarboxylic acid sulfomonomer containing at least one metallic sulfonate group or nitrogen-containing non-metallic sulfonate group attached to an aromatic or cyclo-aliphatic nucleus; and (e) is 0 to 40 mol % of a multifunctional reactant containing at least three functional groups selected from hydroxyl, carboxyl, and mixtures thereof, The present invention is also directed to a two step process for the preparation of a polyester comprising:

(I) reacting the reactants (A) and (B) in the presence of a catalytic amount of a catalyst under conditions such that substantially all of the acid functionality of reactant (A) is esterfied and an intermediate reaction product is formed;

(II) reacting the resultant intermediate reaction product with reactants (a), (c), (d), and (e) above under polycondensation conditions.

The present invention is also directed to coating compositions and coated articles containing the polyester material and will be described hereinafter.

DETAILED DESCRIPTION OF THE INVENTION

Applicant has unexpectedly discovered improved water-dispersible polyesters and methods of making these polyesters. These polyesters are prepared from reactants that include a mono-functional sulfomonomer and do not have unreacted carboxylic acid groups on the ends of the polyester chains attached to the sulfomonomer. These polyesters thus are no longer acidic and the resulting aqueous polyester dispersions have substantially improved stability. Additionally, applicant has discovered that pigmented coatings prepared from these dispersions have substantially improved stability.

The compositions and processes of the present invention are particularly useful since the water dispersible resins containing sulfomonomer, such as 5-SSIPA resin, cold flow at room temperature. Therefore, it is very desirable to store these resins in a predispersion containing a substantial amount of polyester in the liquid. However, the predispersions containing the resins prepared from a dicarboxylic acid sulfomonomer are generally unstable and separate out over time. It was discovered that the stability could be substantially increased according to the present invention when the resin is prepared from a multifunctional reactant containing at least three hydroxyl groups and a monocarboxylic acid sulfomonomer, such as 3-sodiosulfobenzoic acid (3-SSBA).

The composition according to the present invention preferably forms a dispersion or predispersion having a pH between about 4 and 7 preferably between 5 and 6 and has essentially no free carboxyl end groups attached to the sulfomonomer residue of reactant (b).

The preferred method for arriving at the stabilized polyester resins used in the water-dispersible compositions of the present invention is the two step process of prereacting (b) above with at least a portion of (e) above followed by reacting the remaining reactants. This process entails:

(I) reacting (A) a monocarboxylic acid sulfomonomer containing at least one metallic sulfonate group or nitrogen-containing non-metallic sulfonate group attached to an aromatic or cycloaliphatic nucleus, and (B) a multifunctional reactant containing at least three hydroxyl groups, in the presence of a catalytic amount of a catalyst under conditions such that substantially all of the acid functionality of reactant (A) is esterified and an intermediate reaction product is formed;

(II) reacting in the presence of a catalytic amount of a catalyst the intermediate reaction product formed by step (I) with (a) at least one difunctional dicarboxylic acid which is not a sulfomonomer;

(c) at least one difunctional reactant selected from a glycol or a mixture of a glycol and diamine having two —NRH groups, the glycol containing two —C(R$^1$-)$_2$—OH groups wherein R in the reactant is hydrogen or an alkyl group of 1 to 6 carbon atoms, and R1 in the reactant is a hydrogen atom, an alkyl of 1 to 5 carbon atoms, or an aryl group of 6 to 10 carbon atoms;.

(d) about 0 to 40 mol % of difunctional reactant selected from hydroxycarboxylic acids having one —C(R)$_2$—OH group, aminocarboxylic acids having one —NRH group, amino-alcohols having one —C(R-)$_2$—OH group and one —NRH group, or mixtures of said difunctional reactants wherein R in the reactant is hydrogen or an alkyl group of 1 to 6 carbon atoms; and (e) 0 to 40 mol % of a multifunctional reactant containing at least three functional groups selected from hydroxyl, carboxyl, and mixtures thereof, such that a water-dispersible polyester is formed, wherein all stated mol percentages are based on the total of all acid, hydroxyl and amino group containing reactants being equal to 200 mol %, and wherein the polymer contains proportions of acid-group containing reactants (100 mol % acid) to hydroxy- and amino-group containing reactants (100 mol % base) such that the value of EQ (base) divided by EQ (acid) is between about 0.5 and 2.

Each step of the two step process of the present invention is preferably conducted at a temperature between about 150° and 240° C., more preferably between 170° and 220° C. Each step of this process is preferably started at a lower temperature of about 130° to 150° C. then increased to a temperature of about 170° to 220° C.

The first step of this two step process, in which the diol adduct is prepared in situ prior to polymerization, is preferably conducted at a temperature between 170° and 220° C. The multifunctional reactant containing at least three hydroxyl groups is preferably added in molar excess, more preferably in large molar excess, such that the monocarboxylic acid sulfomonomer is entirely reacted.

As used herein the term "multifunctional" or "branch-inducing" refers to a compound having three or more reactive hydroxyl and/or carboxyl substituents such as a triol or a tricarboxylic acid; the term "glycol" refers to a compound having two hydroxyl substituents; the term "polyol" refers to a compound having at least two hydroxyl substituents; the term "water-dissipatable polyesters," water-dissipatable polymer," "polyester material," or "the polyester" refers to the polyester or polyesteramide described above.

Whenever the term "water-dissipatable" or "water-dispersible" is used in this description, it will be understood to refer to the activity of a water or aqueous solution on the polymer. The term is specifically intended to cover those situations wherein the solution dissolves and/or disperses the polyester material therein and/or therethrough.

The term "EQ(base)" means the total number of equivalents of all (100 mol % base) of the hydroxyl and amino functionality from (b), (c), (d) and (e). This total is obtained by multiplying the number of mols of each reactant in this grouping by its functionality, i.e., the total number of hydroxyl plus amino groups per mol of reactant which are available for condensation polymerization with acid (or ester) groups; and the term "EQ(acid)" means the total number of equivalents of all (100 mol % acid) of the acid functionality from (a), (b), (d) and (e). This total is obtained by multiplying the number of mols of each reactant in this grouping by its functionality, i.e., the total number of acid groups (or equivalent ester and amide-forming derivatives thereof) which are available for condensation polymerization with hydroxyl and amino groups.

Reactant (b) in the polyester process of the present invention is a monofunctional monomer in the one step process and a diol adduct of the monofunctional in the two step process. This monofunctional monomer contains a —$SO_3M$ group attached to an aromatic nucleus, wherein M is hydrogen or a metal ion. This monofunctional monomer component is a monocarboxylic acid containing a —$SO_3M$ group. The metal ion of the sulfonate salt group may be Na+, Li+, K+, Mg++, Ca++, Cu++, Fe++, or Fe+++; preferred are monovalent cations.

The —$SO_3M$ group is attached to an aromatic nucleus, examples of which include benzene, naphthalene, anthracene, diphenyl, oxydiphenyl, sulfonyldiphenyl, and methylenediphenyl.

The nonmetallic portion of the nonmetallic sulfonate group optionally present in reactant (b) is a nitrogen-based cation derived from nitrogen-containing bases which may be aliphatic, cycloaliphatic or aromatic basic compounds that have ionization constants in water at 25° C. of $10^{-3}$ to $10^{-10}$, preferably $10^{-5}$ to $10^{-8}$. Especially preferred nitrogen containing bases are ammonia, dimethylethanolamine, diethanolamine, triethanolamine, pyridine, morpholine, and piperidine. Such nitrogen-containing bases and cations derived therefrom are described in U.S. Pat. No. 4,304,901, incorporated herein by reference.

Examples of suitable monocarboxylic acid sulfomonomers include those of the formulae:

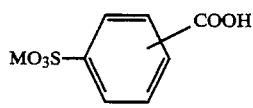

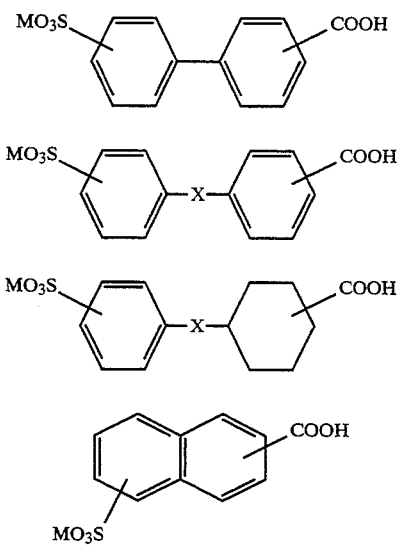

wherein M is Na+, K+, or NH4+ and X is O, S, $CH_2$, or $SO_2$. The most preferred monocarboxylic acid sulfomonomer is 3-Sodiosulfobenzoic Acid (3-SSBA).

It is preferred that reactant (b) is present in an amount of about 1 to 20 mol percent, more preferred is about 2 to 12 mol percent; and most preferred is about 3.5 to 4.5 mol percent.

The dicarboxylic acid component (reactant (a)) of the polyester comprises aliphatic dicarboxylic acids, alicyclic dicarboxylic acids, aromatic dicarboxylic acids, or mixtures of two or more of these acids. Examples of such dicarboxylic acids include oxalic; malonic; dimethylmalonic; succinic; glutaric; adipic; trimethyladipic; pimelic; 2,2-dimethylglutaric; azelaic; sebacic; fumaric; maleic; itaconic; 1,3-cyclopentane-dicarboxylic; 1,2-cyclohexanedi-carboxylic; 1,3-cyclohexanedicarboxylic; 1,4-cyclo-hexanedicarboxylic; 1,3-cyclopentanedicarboxylic; 1,2-cyclohexanedi-carboxylic; 1,3-cyclohexanedicarboxylic;-1,4-cyclohexanedicarboxylic; phthalic; terephthalic; isophthalic; 2,5-norbornanedicarboxylic; 1,4-naphthalic; diphenic; 4,4'-oxydibenzoic; diglycolic; thiodipropionic; 4,4'-sulfonyldibenzoic; and 2,5-naphthalenedicarboxylic acids and esters thereof.

Preferred difunctional dicarboxylic acids (reactant (a)) include isophthalic acid, terephthalic acid, phthalic anhydride (acid), adipic acid, tetrachloro-phthalic anhydride, pivalic acid, dodecanedioic acid, sebacic acid, azelaic acid, 1,4-cyclohexanedicarboxylic acid, 1,3-cyclohexane-dicarboxylic acid, maleic anhydride, fumaric acid, succinic anhydride (acid), 2,6-naphthalenedicarboxylic acid, glutaric acid and esters thereof.

It is preferred that reactant (c) is a glycol or mixture of glycols. The glycol component may consist of aliphatic, alicyclic, and aralkyl glycols. Examples of these glycols include ethylene glycol; propylene glycol; 1,3-propanediol; 2,4-dimethyl-2-ethyl-hexane-1,3-diol; 2,2-dimethyl-1,3-propanediol; 2-ethyl-2-butyl--1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclo-hexanedimethanol; 1,3-cyclo-hexanedimethanol; 1,4-cyclohexanedimethanol; 2,2,4,4-tetramethyl-1,3-cyclobutanediol; p-xylylenediol. Examples of other suitable glycols are poly(ethylene glycols) which include diethylene glycol, triethylene glycol, tetraethylene glycol, and pentaethylene, hexaethylene, heptaethylene, octaethylene, nonaethylene, and decaethylene glycols, and mixtures thereof. A preferred poly(ethylene glycol) employed in the polyester of the present invention is diethylene glycol or triethylene glycol or mixtures thereof. Copolymers may be prepared from two or more of the above glycols. Preferred glycols include ethylene glycol; diethylene glycol; 2,2-dimethyl-1,3-propanediol; 2-ethyl-2-butyl-1,3-propanediol; 2,2,4-trimethyl-1,3-pentanediol; 1,4-cyclohexane-dimethanol; 1,3-cyclo-hexanedimethanol; hydroxypivalyl hydroxypivalate; dipropylene glycol; 1,6-hexanediol; 1,10-decanediol; 1,3-butanediol; hydrogenated bisphenol A; 1,4-butanediol and the like.

Advantageous difunctional components which are aminoalcohols include aromatic, aliphatic, heterocyclic and other types as in regard to component (d). Specific examples include 5-aminopentanol-1, 4-aminomethylcyclohexanemethanol, 5-amino-2-ethyl-pentanol-1, 2-(4-β-hydroxyethoxyphenyl)-1-aminoethane, 3-amino-2,2-dimethylpropanol, hydroxyethylamine, etc. Generally these aminoalcohols contain from 2 to 20 carbon atoms, one —NRH group and one —C(R)$_2$—OH group.

Advantageous difunctional monomer components which are aminocarboxylic acids include aromatic aliphatic, heterocyclic, and other types as in regard to component (d) and include lactams. Specific examples include 6-aminocaproic acid, its lactam known as caprolactam, omega-aminoundecanoic acid, 3-amino-2-dimethylpropionic acid, 4-(β-aminoethyl)-benzoic acid, 2-(β-amino-propoxy)benzoic acid, 4-aminomethylcyclohexanecarboxylic acid, 2-(β-aminopropoxy)cyclohexanecarboxylic acid, etc. Generally these compounds contain from 2 to 20 carbon atoms.

Advantageous examples of difunctional monomer component (d) which are diamines include ethylenediamine; hexamethylenediamine; 2,2,4-trimethylhexamethylenediamine; 4-oxaheptane-1,7-diamine; 4,7-dioxadecane1,10-diamine; 1,4-cyclohexanebismethylamine; 1,3-cycloheptamethylenediamine; dodecamethylenediamine, etc.

Reactant (e) in the two step process, need not be a polyhydroxyl compound since the polyhydroxyl compound is reacted in the first step. Reactant (e) is also optional in the two step process. However, when used, preferably contains 3 to 6 hydroxyl and/or carboxyl groups; most preferred is trimethylolpropane (TMP), trimethylolethane (TME), glycerine, pentaerylthritol, erytritol, threitol, dipentaerythritol, sorbitol, trimellitic anhydride, pyromellitic dianhydride, or dimethylolpropionic acid.

It is preferred that reactant (e) is present in a minor amount up to 40 mol percent, more preferred is about 1 to 20 mol percent, and most preferred is about 10 to 20 mol percent.

In other more preferred embodiments of the invention: the water-dissipatable polyester comprises an acid component (moiety) of 20 to about 100 mol percent isophthalic acid, about 10 to about 80 mol percent adipic acid and from about 1 to 20 mol percent 3-SSBA and a polyol component (moiety) of at least about 60 mol percent neopentyl glycol, 1,4-cyclohexanedimethanol, 2-ethyl-2-butyl-1,3-propanediol, or a mixture thereof (the term "moiety" as used herein designates the residual portion of the reactant acid or polyol which actually enters into or onto the polymer chain during the condensation or polycondensation reaction).

The weight average molecule weight of the polyester is preferably 5,000 to 25,000; more preferred is 10,000 to 20,000.

The number average molecular weight of the polyester is preferably 1,000 to 5,000; more preferred is 1,500 to 3,500.

It is preferred that the acid number of the polyester is less than 20, more preferred is less than 10.

An aqueous dispersion of the polyester is preferably stable. Stability is defined as the absence of polymer coagulation or phase separation of an aqueous polyester preparation (15 to 80 weight percent polyester solids) after shelf storage for a minimum of four months at 20° to 30° C. Dispersions of the polyesters prepared according to the present invention were generally stable for over six months.

The catalyst is preferably an organo-metallic compound especially a tin or titanium containing compound. Examples include dibutyltinoxide, stannous oxalate, butylstannoic acid, and titaniumtetraiso-propoxide. The catalytic amount is preferably 0.1%, based on the total weight of reactants.

The particular polyester can be isolated neat; however, it is desirable for typical material handling purposes to prepare a dispersion or solution of the polyester. This dispersion or solution comprises 10 to 50 weight percent of liquid which comprises 0 to 90 weight percent water and 10 to 100 weight percent of a suitable oxygen-containing organic solvent such as alcohols, ketones, esters and ethers; preferred are low molecular weight alcohols such as $C_1$-$C_{10}$ alcohols, e.g., ethanol, n-propanol, iso-propanol, and iso-butanol. Such a dispersion can be used as a coating composition or can be used as a pre-dispersion to prepare a coating composition. The pH of such a dispersion is preferably about 4 to about 7; more preferred is 5 to about 6.

The coating composition of the present invention comprises (A) about 15 to about 45 percent, based on the weight of the total composition, of polyester material, (B) about 30 to about 80 percent, based on the weight of the total coating composition, of water, (C) about 0 to about 30 percent, based on the weight of the total coating composition, of a suitable oxygen-containing organic solvent, and (D) about 0 to about 40 percent, based on the weight of the polyester, of a crosslinking agent.

Preferred amounts of (A) of the coating composition are 20 to 40 percent; more preferred are 25 to percent.

Preferred amounts of (B) of the coating composition are 60 to 75 percent; more preferred are 67 to 72 percent. Preferred amounts of (C) are 3 to 10 percent; more preferred are 4 to 6 percent. Preferred amounts of (D) are 5 to 40 percent; more preferred are 20 to 40 percent, and most preferred are 25 to 35 percent.

As appreciated in the art, the exact components and properties of components desired for any given coating application can vary, and therefore, routine experimentation may be required to determine the optional components and proportions of components for a given application and desired properties.

Preferred crosslinking agents contain substituted melamine and urea resins or residues such as hexamethoxymethylmelamine, hexabutoxymethylmelamine, tetramethoxymethylurea, or tetrapropoxymethylurea.

The coating composition optionally contains up to 70 weight percent based on the weight of polyester of one or more additional coating additives.

A preferred amount of coating additives is 1 to 30 percent. Examples of such coating additives include flow control additives such as silicones, fluorocarbons, or cellulosics; coalescing solvents such as diethylene glycol monobutyl ether, trimethylpentanediol monoisobutyrate, or ethylene glycol mono-octyl ether; strong acids such as p-toluenesulfonic acid, trichloroacetic acid, or trifluoromethanesulfonic acid; pigments such as titanium dioxide, barytes, clay, or calcium carbonate; colorants such as phthalocyanine blue, molybdate orange, or carbon black; biocides such as tin compounds (e.g., tributyltin oxide), quaternary ammonium compounds, or iodine compounds; thickeners such as carboxymethyl cellulose, hydroxypropyl methyl cellulose, ethyl hydroxyethyl cellulose, guar gum; and wetting and dispersing additives that are surfactants such as Disperbyk, Disperbyk-181, Disperbyk--101, BYK-P104S, available from BYK-Chemie USA, and silicones such as the Dow Corning silicones including Dow Corning 14 additive.

It is preferred that the coating composition of the present invention not contain, or be in the substantial absence of basic amine additives. Basic amine additives mean additives that are primary, secondary and tertiary amines such as ammonium hydroxide, N,N'-dimethylethanolamine, and triethylamine. Basic amine additives do not include ammonium salts, such as the ammonium salts of the wetting and dispersing additives.

The coating composition can be prepared by the techniques described herein and/or by techniques known in the art, e.g., as disclosed in U.S. Pat. Nos. 4,698,391, 4,737,551, and 3,345,313; the disclosures of which are incorporated herein by reference in their entirety.

The coating composition can be coated into a substrate and crosslinked using techniques known in the art; e.g., by spray-applying a wet coating and baking in a 150° C. forced air oven for 30 minutes to result in a dry film of about 0.5 to 2 mils (0.0125 to 0.05 mm).

The substrate can be any common substrate such as paper; films such as polyester, polyethylene or polypropylene; metals such as aluminum or steel; glass; urethane elastomers, primed (painted) substrates; and the like.

The coating composition is preferably a paint such as a clear or pigmented enamel, a lacquer, an ink or a varnish.

After the coating composition is coated onto a substrate and cured (i.e., crosslinked) such cured coating has many desirable properties such as good pencil hardness, good gloss, good flexibility, good stain resistance, good humidity resistance, good impact resistance, and good MEK double rub solvent resistance.

The following examples are to illustrate the present invention but should not be interpreted as a limitation thereof.

EXAMPLES

EXAMPLE 1

Preparation of the Resin by One-Step Method

To a three-neck round bottom flask equipped with a mechanical stirrer, a steam partial-condenser, a Dean-Stark trap, and a water condenser were charged the following reactants: NPG 203 g (1.95 mole), TMP 45 g (0.34 mole), IPA 200 g, AD 123 g (0.84 mole), 3-SSBA 17 g (0.076 mole), and Fascat 4100 (0.5g, a butylstanoic acid catalyst from Atochem). The mixture was heated to 150° C. and stirred under nitrogen atmosphere. The temperature was then gradually increased to 220° C. and the distillate (water) collected in the Dean-Stark trap. The reaction was complete after stirring for ten hours to give a resin with an acid number of 5 and a number average molecular weight of 1800. A dispersion was prepared first by dissolving the resulting resin in isopropanol (100g) at 80° C., followed by dispersing in distilled water (100 g).

EXAMPLE 2

Two Step Preparation of the Resin

To a three-neck round bottom flask equipped with a mechanical stirrer, a steam partial-condenser, a Dean-Stark trap, and a water condenser were charged the following reactants: TMP 26.8 g (0.20 mole), 3-SSBA 10.62 g (0.047 mole), and the catalyst, Fascat 4100 (0.1 g). The mixture was heated to 150° C. and stirred under $N_2$ atmosphere. The temperature was then gradually increased to 220° C. and the distillate (water) was collected in the Dean-Stark trap. After 1 hr the acid number was determined to be close to zero, and the mixture was cooled to 150° C. The second stage reactants, NPG 129.0 g (1.24 mole), IPA 116.8 g (0.70 mole), and AD 71.8 g (0.49 mole), were then added. The temperature was gradually raised to 220° C., and the reaction continued for 3.5 more hours to yield a resin with an acid number of 3, and a number average molecular weight of 2600. The predispersion was prepared first by dissolving the resulting resin in isopropanol (63 g) at 80° C., followed by dispersing in distilled water (63 g).

The clear enamel and $TiO_2$ pigmented enamel were prepared as described in Examples 3 and 4.

EXAMPLE 3

Preparation of Clear Enamels

The clear enamel was prepared by dispersing the resin predispersion from Example 2 (28 g) in distilled water (30 ml) with a blender (Waring), followed by the addition and mixing of the cross-linker, hexamethoxymethylmelamine (Cymel 303, 8.6 g), and the flow control additive (20% Fluorad FC-430 from 3M in i-PrOH, 0.3 g).

EXAMPLE 4

Preparation of Pigmented Enamels

The white enamel was prepared first by dispersing the resin predispersion from Example 2 (28 g) in distilled water (25 ml) with a blender (Waring). A slurry of $TiO_2$ pigment (Du Pont R-902, R-960, or R-931) was prepared separately by mixing $TiO_2$ (20 g) and Disperbyk-181 a polymeric surfactant from Byk-Chemie U.S.A. (0.5 g) in distilled water (15 ml). The slurry was then added to the above resin dispersion, followed by the cross-linker (Cymel 303, from American Cyanide, 8.6 g), and the flow control additive (20% Fluorad FC--430 in i-PrOH, 0.3 g). The mixture was stirred for about five minutes to yield a white enamel.

Coatings were prepared by applying various enamels to cold-rolled steel test panels and cured at 175° C. for 20 min. The thickness of the films was about 1.0–1.5 mil. The coatings were tested by using the following standard methods:

1. Film Thickness (Fisher Deltascope MP2-ASTM B499)
2. Gloss (ASTM D523)
3. Hardness (ASTM D3363)
4. Impact Resistance (ASTM D2794)
5. Solvent Resistance (ASTM D1308)

The coating properties are shown in Table I.

TABLE I

| Coating Properties | clear | white |
|---|---|---|
| gloss, 60°/20° | 98/82 | 93/68 |
| pencil hardness | H | 4H |
| impact resistance (lb-in) direct/reverse | 160/160 | 160/160 |
| solvent resistance (MEK double rubs) | >200 | >200 |

I claim:

1. A water-dispersible composition comprising the polyester made of the moieties of reaction products:
   (a) at least one difunctional dicarboxylic acid which is not a sulfomonomer;
   (b) about 1 to 20 mol % of at least one monocarboxylic acid sulfomonomer containing at least one metallic sulfonate group or nitrogen-containing non-metallic sulfonate group attached to an aromatic or cycloaliphatic nucleus;
   (c) at least one difunctional reactant selected from a glycol or a mixture of a glycol and diamine having two —NRH groups, the glycol containing two —C($R^1$)$_2$—OH groups wherein R in the reactant is hydrogen or an alkyl group of 1 to 6 carbon atoms, and $R^1$ in the reactant is a hydrogen atom, an alkyl of 1 to 5 carbon atoms, or an aryl group of 6 to 10 carbon atoms;
   (d) about 0 to 40 mol % of difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and
   (e) up to 40 mol % of a multifunctional reactant containing at least three functional groups selected from hydroxyl, carboxyl, and mixtures thereof wherein at least a portion of the multifunctional reactant contains at least three hydroxyl groups, wherein all stated mol percentages are based on the total of all acid, hydroxyl and amino group containing reactants being equal to 200 mol %, and wherein the polymer is no longer acidic, having an acid number less than 20 and contains proportions of acid-group containing reactants (100 mol % acid) to hydroxy- and amino-group containing reactants (100 mol % base) such that the value of EQ (base) divided by EQ (acid) is between about 0.5 and 2.

2. The composition according to claim 1 wherein (e) is about 1 to 40 mol % of a multifunctional reactant containing at least three hydroxyl groups.

3. A process for the preparation of a polyester comprising reacting the following reactants under polycondensation conditions:
   (a) at least one difunctional dicarboxylic acid which is not a sulfomonomer;
   (b) about 1 to 20 mol % of at least one monocarboxylic acid sulfomonomer containing at least one metallic sulfonate group or nitrogen-containing non-metallic sulfonate group attached to an aromatic or cycloaliphatic nucleus;
   (c) at least one difunctional reactant selected from a glycol or a mixture of a glycol and diamine having two —NRH groups, the glycol containing two —C($R^1$)$_2$—OH groups wherein R in the reactant is hydrogen or an alkyl group of 1 to 6 carbon atoms, and $R^1$ in the reactant is a hydrogen atom, an alkyl of 1 to 5 carbon atoms, or an aryl group of 6 to 10 carbon atoms;
   (d) about 0 to 40 mol % of difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and
   (e) up to 40 mol % of a multifunctional reactant containing at least three functional groups selected from hydroxyl, carboxyl, and mixtures thereof wherein at least a portion of the multifunctional reactant contains at least three hydroxyl groups, wherein all stated mol percentages are based on the total of all acid, hydroxyl and amino group containing reactants being equal to 200 mol %, and wherein the polymer is no longer acidic, having an acid number less than 20 and contains proportions of acid-group containing reactants (100 mol % acid) to hydroxy- and amino-group containing reactants (100 mol % base) such that the value of EQ (base) divided by EQ (acid) is between about 0.5 and 2.

4. The composition comprising the ester adduct made of the moieties of reaction products:
   (A) a monocarboxylic acid sulfomonomer containing at least one metallic sulfonate group or nitrogen-containing non-metallic sulfonate group attached to an aromatic or cycloaliphatic nucleus, and
   (B) a multifunctional reactant containing at least three hydroxyl groups.

5. A water-dispersible composition comprising the polyester made of the moieties of reaction products:
   (a) at least one difunctional dicarboxylic acid which is not a sulfomonomer;
   (b) about 1 to 20 mol % of at least one diol that is a diol adduct of a multifunctional reactant containing at least three hydroxyl groups and a monocarboxylic acid sulfomonomer containing at least one metallic sulfonate group or nitrogen-containing non-metallic sulfonate group attached to an aromatic or cyclo-aliphatic nucleus;
   (c) at least one difunctional reactant selected from a glycol or a mixture of a glycol and diamine having two —NRH groups, the glycol containing two —C($R^1$)$_2$—OH groups wherein R in the reactant is hydrogen or an alkyl group of 1 to 6 carbon atoms, and $R^1$ in the reactant is a hydrogen atom, an alkyl of 1 to 5 carbon atoms, or an aryl group of 6 to 10 carbon atoms;
   (d) about 0 to 40 mol % of difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and (e) about 0 to 40 mol % of a multifunctional reactant containing at least three functional groups selected from hydroxyl, carboxyl, and mixtures thereof, wherein all stated mol percentages are based on the total of all acid, hydroxyl and amino group containing reactants being equal to 200 mol %, and wherein the polymer is no longer acidic, having an acid number less than 20 and contains proportions of acid-group containing reactants (100 mol % acid) to hydroxy- and amino-group containing reactants (100 mol % base) such that the value of EQ (base) divided by EQ (acid) is between about 0.5 and 2.

6. The composition of claim 5 wherein reactant (b) is selected from the diol adduct prepared from a monocarboxylic acid sulfomonomer of the following:

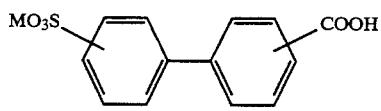

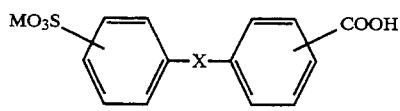

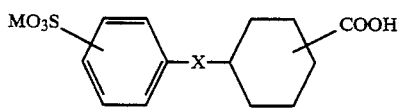

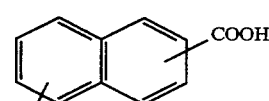

wherein M is $Na^+$, $K^+$, or $NH_4^+$ and X is O, S, $CH_2$, or $SO_2$.

7. The composition of claim 6 wherein said monocarboxylic acid sulfomonomer is 3-sodiosulfobenzoic acid.

8. The composition of claim 5 wherein reactant (c) is selected from residues of neopentyl glycol, cyclohexanedimethanol, 2-butyl-2-ethyl-1,3-propanediol, hydroxypivalyl hydroxypivalate, 2,2,4-trimethyl-1,3-pentanediol, and 2-methyl-1,3-propanediol.

9. The composition of claim 8 wherein reactant (c) is neopentyl glycol.

10. The composition of claim 5 wherein reactant (e) is selected from residues of trimethylolpropane, trimethylolethane, glycerol, 2,2-bis(hydroxymethyl)-1,3-propanediol, 1,2,3,4-tetrahydroxy-butane, 1,2,3,4,5-pentahydroxypentane, and 1,2,3,4,5,6-hexahydroxyhexane.

11. The composition of claim 10 wherein reactant (e) is trimethylolpropane.

12. The composition of claim 5 wherein reactants (a) are isophthalic acid and adipic acid.

13. The composition of claim 5 wherein the moiety from reactant (a) is between about 20 to 100 mol % of an aromatic dicarboxylic acid and about 10 to 80 mol % of an aliphatic dicarboxylic acid; the moiety from reactant (b) is present in a concentration of about 1 to about 20 mol%; the moiety from reactant (c) is present in a concentration-of at least 60 mol %; and the moiety from reactant (e) is present in a concentration of about 1 to 40 mol %.

14. The composition of claim 13 wherein the moiety from reactant (a) is between about 40 to 70 mol % of an aromatic dicarboxylic acid and about 10 to 60 mol % of an aliphatic dicarboxylic acid; the moiety from reactant (b) is present in a concentration of about 2 to about 12 mol%; the moiety from reactant (c) is present in a concentration of at least 70 mol %; and the moiety from reactant (e) is present in a concentration of about 10 to 20 mol %.

15. The composition of claim 14 wherein the moiety from reactant (a) is between about 55 to 60 mol % of an aromatic dicarboxylic acid and about 35 to 45 mol % of an aliphatic dicarboxylic acid; the moiety from reactant (b) is present in a concentration of about 3.5 to 4.5 mol %, the moiety from reactant (c) is present in a concentration of at least 80 mol %, and the moiety from reactant (e) is present in a concentration of about 14 to 18 mol % and wherein the acid number of the polyester is less than 10.

16. A coating composition comprising:
   (A) 15 to 45 percent, based on the weight of the total coating composition, of the polyester of claim 5,
   (B) 30 to 80 percent, based on the weight of the total coating composition, of water,
   (C) 0 to 30 percent, based on the total weight of the coating composition, of a suitable organic solvent, and
   (D) 0 to 40 weight percent of a crosslinking agent, based on the weight of the polyester and the crosslinking agent.

17. The coating composition according to claim 16 wherein the amount of component (A) is 20 to 40 percent, the amount of component (B) is 60 to 75 percent, the amount of component (C) is 3 to 10 percent, and the amount of component (D) is 20 to 35 percent.

18. The coating composition according to claim 17 wherein said coating composition contains at least one pigment.

19. The coating composition according to claim 18 wherein said coating composition further contains at least one pigment dispersing additive.

20. The coating composition according to claim 19 wherein said pigment dispersing additive is selected from Disperbyk-181, Disperbyk, Disperbyk 101, BYK-P104S available from BYK-Chemie USA, and Dow-Corning 14 additive.

21. A shaped or formed article coated with the cured enamel composition according to claim 5.

22. A coated substrate comprising the coating composition according to claim 16 coated onto a substrate.

23. The coated substrate of claim 22 wherein said substrate is paper, polyethylene, polypropylene, polyester, aluminum, steel, glass, or a urethane elastomer.

24. A process for the preparation of a polyester comprising
   (I) reacting in the presence of a catalytic amount of a catalyst, a multifunctional reactant containing at least three hydroxyl groups and (b) a monocarboxylic acid sulfomonomer containing at least one metallic sulfonate group or nitrogen-containing non-metallic sulfonate group attached to an aromatic or cycloaliphatic nucleus, under conditions such that substantially all of the acid functionalty of said monocarboxylic acid sulfomomoner is esterified and an intermediate reaction product is formed;

(II) reacting the resultant intermediate reaction product with the following reactants;

(a) at least one difunctional dicarboxylic acid which is not a sulfomonomer;

(c) at least one difunctional reactant selected from a glycol or a mixture of a glycol and diamine having two —NRH groups, the glycol containing two —C($R^1$)$_2$—OH groups wherein R in the reactant is hydrogen or an alkyl group of 1 to 6 carbon atoms, and $R^1$ in the reactant is a hydrogen atom, an alkyl of 1 to 5 carbon atoms, or an aryl group of 6 to 10 carbon atoms;

(d) about 0 to 40 mol % of difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and (e) 0 to 40 mol % of a multifunctional reactant containing at least three functional groups selected from hydroxyl, carboxyl, and mixtures thereof, wherein all stated mol percentages are based on the total of all acid, hydroxyl and amino group containing reactants being equal to 200 mol %, and wherein the polymer contains proportions of acid-group containing reactants (100 mol % acid) to hydroxy- and amino-group containing reactants (100 mol % base) such that the value of EQ (base) divided by EQ (acid) is between about 0.5 and 2.

25. The process according to claim 24 wherein said multifunctional reactant containing at least three hydroxyl groups is present in molar excess to said monocarboxylic acid sulfomonomer.

* * * * *